US012294596B1

United States Patent
Shang et al.

(10) Patent No.: US 12,294,596 B1
(45) Date of Patent: May 6, 2025

(54) LIGHTWEIGHT INTRUSION DETECTION METHOD AND SYSTEM OF INTERNET OF VEHICLES BASED ON KNOWLEDGE DISTILLATION

(71) Applicant: Guangzhou University, Guangzhou (CN)

(72) Inventors: Wenli Shang, Guangzhou (CN); Xiaojun Yang, Guangzhou (CN); Shuqi Li, Guangzhou (CN); Xiaobin Gao, Guangzhou (CN); Zhiwei Chang, Guangzhou (CN); Zheng Zhou, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 18/923,017

(22) Filed: Oct. 22, 2024

(30) Foreign Application Priority Data

Apr. 30, 2024 (CN) .......................... 202410545327.0

(51) Int. Cl.
*H04L 9/40* (2022.01)
(52) U.S. Cl.
CPC ................ *H04L 63/1416* (2013.01)
(58) Field of Classification Search
CPC ................................................ H04L 63/1416
USPC ........................................................ 726/23
See application file for complete search history.

(56) References Cited

U.S. PATENT DOCUMENTS

| 7,225,343 | B1* | 5/2007 | Honig ..................... G06F 16/13 713/193 |
| 11,100,373 | B1* | 8/2021 | Crosby ................... G16H 30/40 |
| 11,558,266 | B2* | 1/2023 | O'Hara .................... H04L 41/16 |
| 2014/0201838 | A1* | 7/2014 | Varsanyi ............... G06F 21/552 726/23 |
| 2016/0191554 | A1* | 6/2016 | Kaminsky ........... H04L 63/1425 726/23 |
| 2020/0274894 | A1* | 8/2020 | Argoeti ............... H04L 63/1433 |
| 2020/0285737 | A1* | 9/2020 | Kraus ................... G06F 21/552 |
| 2023/0289444 | A1* | 9/2023 | Ermey .................. G06F 21/566 |

\* cited by examiner

*Primary Examiner* — Badrinarayanan
(74) *Attorney, Agent, or Firm* — Getech Law LLC; Jun Ye

(57) ABSTRACT

A lightweight intrusion detection method includes obtaining a feature data set of the internet of vehicles and pre-processing data; dividing pre-processed data into an initial training set, an initial verification set and an initial test set according to a preset proportion, performing data balance on the initial training set to obtain a balanced training set, performing feature selection on the balanced training set, the initial verification set and the test set; obtaining a teacher model by training with the model training set and the model verification set; using the teacher model, the model training set and the model verification set for distillation training to obtain a student model; testing a size and complexity of the student model and the performance of the student model, and saving the student model that passes the test as a lightweight intrusion detection model; and deploying the lightweight intrusion detection model.

7 Claims, 6 Drawing Sheets

| Class Label | Number of Samples |
|---|---|
| Normal | 15,226,830 |
| DoS | 587,521 |
| Fuzzy | 491,847 |
| RPM spoofing | 654,897 |
| Gear spoofing | 597,252 |

FIG. 7

| Class Label | Attack Type | Number of samples |
|---|---|---|
| BENIGN | - | 2,273,097 |
| Bot | Botnets | 1,966 |
| DDoS | DoS | 380,699 |
| DoS Golden-eye | | |
| DoS Hulk | | |
| DoS Slow-httptest | | |
| DoS Slowloris | | |
| Heartbleed | | |
| Port-Scan | Sniffing | 158,930 |
| SSH-Patator | Brute-Force | 13,835 |
| FTP-Patator | | |
| Infiltration | Infiltration | 36 |
| Web Attack -Brute Force | Web Attack | 2,180 |
| Web Attack -Sql Injection | | |
| Web Attack -XSS | | |

FIG. 8

|  | Accuracy | F1_score | Model Size | FLOPs |
|---|---|---|---|---|
| Car-Hacking data set | 99.999% | 99.999% | 13.9KB | 61.2K |
| CICIDS2017 data set | 99.685% | 99.674% | 13.9KB | 282.1K |

FIG. 9

LIGHTWEIGHT INTRUSION DETECTION METHOD AND SYSTEM OF INTERNET OF VEHICLES BASED ON KNOWLEDGE DISTILLATION

TECHNICAL FIELD

The present invention relates to the field of intrusion detection, in particular to intrusion detection of an internet of vehicles.

BACKGROUND

As vehicles become more and more intelligent and interconnected, an internet of vehicles has become a critical component of modern vehicle, providing remote access to vehicle information and a control system as a core component of modern vehicle, which enables the vehicle to communicate with other vehicles, infrastructure and cloud services to achieve intelligent and interconnected functions. However, with development of vehicle-mounted network, network security has attracted wide attention. The complexity of internet of vehicles continues to increase, comprising communication within the vehicle, communication with other vehicles and infrastructure, and integration of a plurality of types of sensor data. This increases a challenge of intrusion detection. Threats such as a malware, hacking, and data leakage all put security and privacy of vehicles and passengers at significant risk. Therefore, intrusion detection of internet of vehicles becomes very important.

Traditional intrusion detection methods of the internet of vehicles are mainly based on rules, feature engineering and statistical methods, but these methods are often unable to effectively deal with complex intrusion threats. With development of artificial intelligence technology, a deep learning technology is widely used to develop classifier-based intrusion detection systems that are capable of distinguishing normal network traffic and different network attacks through traffic data analysis. Researchers use machine learning and deep learning technologies, comprising convolutional neural networks (CNN) and recurrent neural networks (RNN), so as to continuously improve intrusion detection performance of internet of vehicles. Meanwhile, researches focus on multimode data fusion, real-time requirements, and category imbalance to adapt to complex and diverse intrusion scenarios, and help ensure security and reliability of vehicle networks.

In the existing technologies, some intrusion detection methods based on deep learning have problems of too large number of parameters and too complicated operations, which lead to difficulty of model deployment and too long prediction time. Existing researches show that the prediction time of internet of vehicles should be completed within 10 ms, but resources of devices of internet of vehicles are often limited, so many intrusion detection methods based on the deep learning are not applicable. Although some lightweight intrusion detection algorithms can solve the above problems, their performance often lags far behind that of non-lightweight models.

SUMMARY

A technical problem to be solved by the present invention is to ensure the performance of a model while making the model lightweight and easier to be deployed.

Provided in the present invention is a lightweight intrusion detection method of an internet of vehicles based on knowledge distillation, which utilizes two intrusion detection models of the internet of vehicles, wherein one model has relatively high number of parameters and computational complexity, good model performance and generalization, and is called a teacher model; and the other one is called a student model because of its small number of parameters, low computational complexity and poor model performance and generalization. By using an output of teacher model as a soft label of training of student model and distilling, the student model is capable of making full use of the rich information of teacher model better and obtaining better performance and generalization.

In order to achieve the above purposes, in a first aspect of the present invention, provided is a lightweight intrusion detection method of an internet of vehicles based on knowledge distillation, comprises the following steps:

S1: obtaining traffic data of the internet of vehicles, extracting network traffic features therefrom as a feature data set, and pre-processing the data;

S2: dividing pre-processed data into an initial training set, an initial verification set and an initial test set according to a preset proportion, performing data balance on the initial training set to obtain a balanced training set, performing feature selection on the balanced training set, the initial verification set and the initial test set to obtain a model training set, a model verification set and a model test set;

S3: building a first model, inputting the model training set and the model verification set into the first model for model training, and obtaining a teacher model after the training;

S4: building a second model, and using the teacher model, the model training set and the model verification set to perform distillation training on the second model, and obtaining a student model after the training;

S5: testing a size and complexity of the student model, if the size and the complexity are higher than a preset value, adjusting parameters of the second model, and performing S4 again, and if the size and the complexity are lower than the preset value, using the model test set to test the performance of the student model; and if the test passes, saving the student model as a lightweight intrusion detection model of an internet of vehicles, and if the test fails, performing S1 to S4 again until the model passes a performance detection; and S6: deploying the lightweight intrusion detection model of the internet of vehicles into the internet of vehicles for an intrusion detection.

Further, the traffic data of the internet of vehicles in S1 comprises normal traffic and attack traffic.

Further, the pre-processing in S2 comprises data cleaning, label coding and data normalization.

Further, in S2, information gain (IG) is configured to screen relatively important features in the feature selection in S2, wherein the information gain of each feature for a whole is calculated, and feature information gain and features accounting for a certain proportion a of the overall feature information gain are screened out finally in an order from large to small as important features, wherein α is a preset threshold, and IG is calculated as follows:

$$IG(X,Z)=H(Z)-H(Z|X)$$

wherein $H(Z)$ is a prior entropy, and $H(Z|X)$ is a posterior entropy; and then, collinearity scores of the important features are calculated and arranged from low to high, and final retained features are screened out according to a preset value β, a collinearity score of each feature is calculated by using a VIF algorithm, and a VIF is calculated as follows:

$$VIF_j = \frac{1}{1 - R_j^2}$$

wherein $R_j^2$ is a determination coefficient of auxiliary regression of a plurality of explanatory variables.

Further, the first model in S3 comprises three parts: an extraction layer, a relationship capture layer and a classification layer, wherein the extraction layer is configured to extract a feature sequence of data, the relationship capture layer is configured to capture a dependency relationship in the feature sequence, and the classification layer is configured to classify the sequence.

Further, the second model in S4 comprises two parts: an extraction layer and a classification layer, wherein the extraction layer is configured to increase the dimensions of data and extract a feature matrix, and the classification layer is configured to classify the feature matrix.

Further, the number of floating point operations are used as a complexity index of the student model in S5.

Further, in S5, the model detection uses accuracy and a balance average as performance indexes of the student model.

In a second aspect of the present invention, provided is a lightweight intrusion detection system of an internet of vehicles, comprising:

an input module, a control module, a detection module, and an output module, wherein the input module is configured to input data to be detected;

the control module is configured to store a computer program and a lightweight intrusion detection model of an internet of vehicles, and is also configured to deliver an instruction through the detection module and the program;

the computer program is configured to implement the methods in the first aspect of the present invention;

the lightweight intrusion detection model of the internet of vehicles is generated by the training according to the methods of the first aspect of the present invention;

the detection module is configured to process the data according to the instruction;

the detection module is further configured to invoke a data model according to the instruction to perform a detection on the data; and the output module is configured to output a detection result.

In a third aspect of the present invention, provided is an intrusion detection terminal of an internet of vehicles, comprising an input device, an output device, a detector, and a controller, wherein the input device, the output device, the detector and the controller are interconnected, wherein the controller is configured to store a lightweight intrusion detection program and a lightweight intrusion detection model of an internet of vehicles, the lightweight intrusion detection program is configured to deliver an instruction to realize the method mentioned in the first aspect of the present invention, the controller is further configured to deliver an instruction to the detector, the detector is configured to pre-process data to be detected input by the input device according to the instruction, and invoke the lightweight intrusion detection model to detect pre-processed data, and the output device is configured to output a detection result.

Compared with the prior art, the present invention has the following beneficial effects:

In the present invention, by using the knowledge distillation method, the complex knowledge learned by the large model (teacher model) is transferred to the lightweight model (student model), and the trained lightweight model has the advantages of small occupied space, fast reasoning time, low resource occupation, etc. This solves the problems such as deployment difficulties caused by the large volume of the conventional intrusion detection model of the internet of vehicles and too long reasoning time caused by the high complexity of the model. Compared with the ordinary lightweight intrusion detection model of the internet of vehicles, the lightweight model trained by the present invention has higher performance.

In the present invention, by using the ADASYN data balancing algorithm, the model is capable of better focusing on a few types of data, and the trained lightweight model is capable of avoiding poor performance on some types of data.

In the present invention, one-dimensional data of the internet of vehicles for training and prediction is directly used, which is more efficient than some intrusion detection models using two-dimensional images.

BRIEF DESCRIPTION OF DRAWINGS

The drawings are used to provide further understanding of the present invention, form part of the specification, and are used together with embodiments of the present invention to explain the technical schemes of the present invention, and do not constitute a limitation of the present invention. In the drawings:

FIG. 7 is an overview of a sample distribution of a Car-Hacking dataset of the present invention.

FIG. 8 is an overview of a sample distribution of a CICIDS2017 dataset of the present invention.

FIG. 9 shows a test result of the present invention.

DETAILED DESCRIPTION OF EMBODIMENTS

Preferred embodiments of the present invention are illustrated in the following in combination with accompanying drawings. It should be understood that the preferred embodiments described herein are only used to illustrate and explain technical schemes of the present invention and are not used to limit the present invention.

EMBODIMENTS

Figure 1:
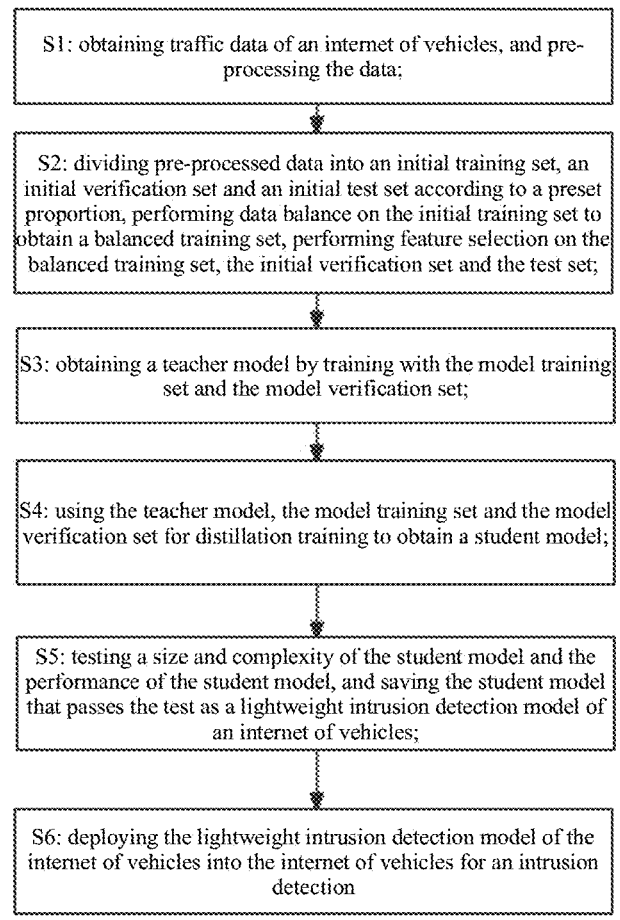
FIG. 1 shows implementation steps of the present invention.
Figure 2:
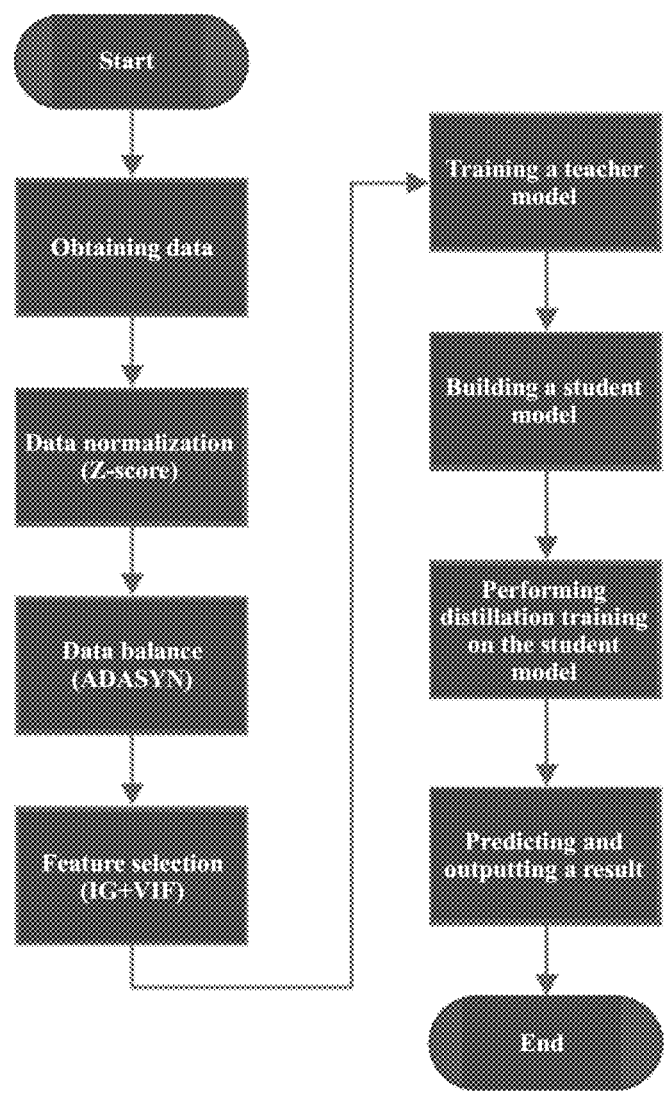
FIG. 2 is a flow chart of the present invention.

First, as shown in FIG. 1 and FIG. 2, provided in an embodiment of the present disclosure is a lightweight intrusion detection method of an internet of vehicles based on knowledge distillation, comprises the following steps:

S1: obtaining traffic data of the internet of vehicles, extracting network traffic features therefrom as a feature data set, and pre-processing the data;

S101: obtaining traffic data of the internet of vehicles, and extracting network traffic features therefrom as a feature data set:

The obtaining traffic data of the internet of vehicles comprises in-vehicle CAN bus traffic and external vehicular network traffic, wherein the in-vehicle CAN bus traffic includes normal traffic and injected attack traffic, and the external vehicular network traffic is collected normal WIFI and cellular network traffic and injected attack traffic.

The vehicle-mounted network traffic data used by the present invention is obtained from a public dataset.

The in-vehicle CAN bus traffic data uses traffic data from a Car-Hacking dataset, which is provided by hacking and countermeasure research (HCR) Lab. The overview of data traffic is shown in FIG. 7, comprising attacks such as denial of service (DOS) attacks, blur attacks, spoofing drive gears and spoofing tachometer attacks, and normal traffic data. The dataset is built by recording the CAN bus traffic of real vehicle via an OBD-II interface while executing a message injection attack.

The external vehicular network traffic is obtained from a CIC-IDS-2017 dataset provided by the communications security establishment (CSE) and the canadian institute for cybersecurity (CIC). An overview of the traffic data is shown in FIG. 8. The CIC-IDS-2017 dataset includes both benign and up-to-date common cyber attacks. Implemented attacks comprise brute force FTP, brute force SSH, DOS, Heartbleed, Web attacks, infiltration, botnets, and DDoS.

S102: pre-processing the data;

First of all, data cleaning is performed on the obtained vehicle-mounted network traffic: the data is screened line by line, and the dirty data screened out is removed; then, the labels of vehicle-mounted network traffic data are encoded, which is helpful to make the model better understand and process the label information, and improve the performance and applicability of the model; and finally, Z-score normalization is used: data features are normalized to prevent the model from failing to converge during training due to large numerical differences among features, and to improve the stability of model training. A formula of Z-score normalization is shown as follows:

$$z - \text{score}(x) = \frac{x - \mu}{\sigma}$$

wherein $\mu$ is a corresponding column feature mean and $\sigma$ corresponds a column variance.

S2: dividing pre-processed data into an initial training set, an initial verification set and an initial test set according to a preset proportion, performing data balance on the initial training set to obtain a balanced training set, performing feature selection on the balanced training set, the initial verification set and the test set to obtain a model training set, a model verification set and a model test set;

S201: dividing the pre-processed traffic data of the internet of vehicles into the initial training set, the initial verification set and the initial test set according to a preset ratio of 0.7:0.1:0.2.

S202: performing the data balancing on the initial training set to obtain the balanced training set:

In order to ensure that the model can accurately generalize a minority class, an ADASYN algorithm is configured to oversample the minority class on the vehicle-mounted network traffic data in the training set. The process of ADASYN algorithm is as follows:

Assuming that $d_{train}$ is the training data set and comprises m samples, $y_i$ is a label of corresponding sample $x_i$, $y_i$ belongs to $\{-1, 1\}$, $m_s$ is the number of samples of the minority class and $m_l$ is the number of samples of majority class.

Then the class unbalance degree is calculated as:

$$imba = \frac{m_s}{m_l}$$

If imba<$imba_{th}$, wherein $imba_{th}$ is a preset maximum class unbalance degree, the following steps are performed:

a) calculating the number of samples needed to be synthesized for the minority class samples:

$$G=(m_l-m_s)\times\beta$$

wherein $\beta$ is a degree desired to control balance;

b) calculating a ratio $r_i$ $$r_i=\Delta_i/K, i=1,\ldots,m_s$$

wherein numerator $\Delta_i$ is the number of samples belonging to the majority class in the K neighbors of $x_i$ (minority class samples);

c) performing normalization on $r_i$ $$\hat{r}_i = r_i / \sum_{i=1}^{m_s} r_i$$

a) calculating the number of samples needed to be generated for $x_i$ (the minority class samples)

$$g_i=\hat{r}_i\times G$$

A generation method of $g_i$ pieces of data is as follows:

A minority class sample $x_{zi}$ is randomly selected from K neighbors of $x_i$ (the minority class samples) and is generated according to the following formula:

$$s_i=x_i+(x_{zi}-x_i)\times\lambda$$

wherein $\lambda$ is a random number in [0, 1] and loops are executed until a required quantity is generated.

S203: performing feature selection on the balanced training set, the initial verification set and the initial test set to obtain a model training set, a model verification set and a model test set:

In order to reduce the complexity of the model, improve the performance of the model and reduce the risk of overfitting, the feature selection is performed on the balanced training set, initial verification set and initial test set.

First, information gain (IG) is configured to screen relatively important features, wherein the information gain of each feature for a whole is calculated, and feature information gain and features accounting for 90% of the overall feature information gain are screened out finally in an order from large to small as important features, wherein 90% is a preset threshold $\alpha$ which may be adjusted according to an actual situation, and IG is calculated as follows:

$$IG(X,Z)=H(Z)-H(Z|X)$$

wherein H(Z) is the prior entropy, H(Z|X) is the posterior entropy, and a difference therebetween is an information gain, reflecting a degree to which the information eliminates the uncertainty.

Some of the important features screened out are redundant features. A collinearity score of each feature is calculated by using a VIF algorithm. The scores are sorted from low to high, and features with collinearity scores less than a set threshold β are screened out as final retained features.

A VIF is calculated as follows:

$$VIF_j = \frac{1}{1-R_j^2}$$

wherein $R_j^2$ is a determination coefficient of auxiliary regression of a plurality of explanatory variables.

The model training set, model verification set and the model test set after feature screening are used for the following model training.

Figure 3:
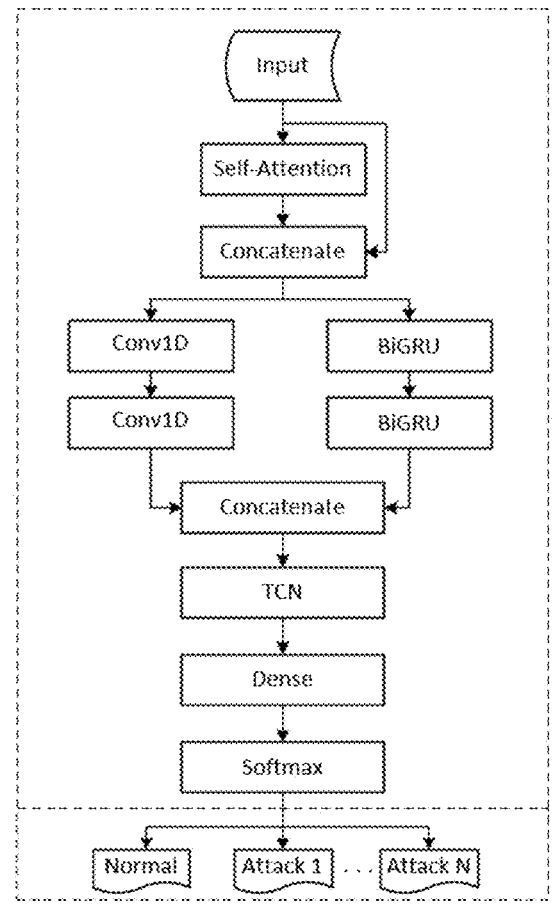
FIG. 3 is a teacher/first model structure of the present invention.

S3: building a first model, training and optimizing the first model with the model training set and the model verification set, and obtaining a teacher model after the training;

The model structure is as shown in FIG. 3, wherein the teacher model in comprises three parts: an extraction layer, a relationship capture layer and a classification layer, wherein the extraction layer is configured to extract a feature sequence of data, the relationship capture layer is configured to capture a dependency relationship in the feature sequence, and the classification layer is configured to classify the sequence.

First, the extraction layer extracts importance of different parts in the input, and then concatenates it with the input to better capture context information and better learn a feature representation of an input sequence. Then they are respectively sent to a Conv1D layer and a BiGRU layer for extracting the time and space information in the sequence in parallel, and the information extracted by the two parallel layers is concatenated to obtain a feature sequence of a first layer.

Then, the feature sequence of the first layer is input to a capture layer, which uses a time convolutional network (TCN) to better capture a distant dependence relationship in the sequence, further expand a perception range of long-term dependence of the model, improve a learning ability of a global pattern, and output a feature sequence of a second layer.

Finally, the feature sequence of the second layer is input into a classification layer to distinguish between normal data and multi-class attack data.

S4: building a second model, and using the teacher model, the model training set and the model verification set to perform distillation training on the second model, and obtaining a student model after the training;

S401: Building the Second Model

Figure 4:
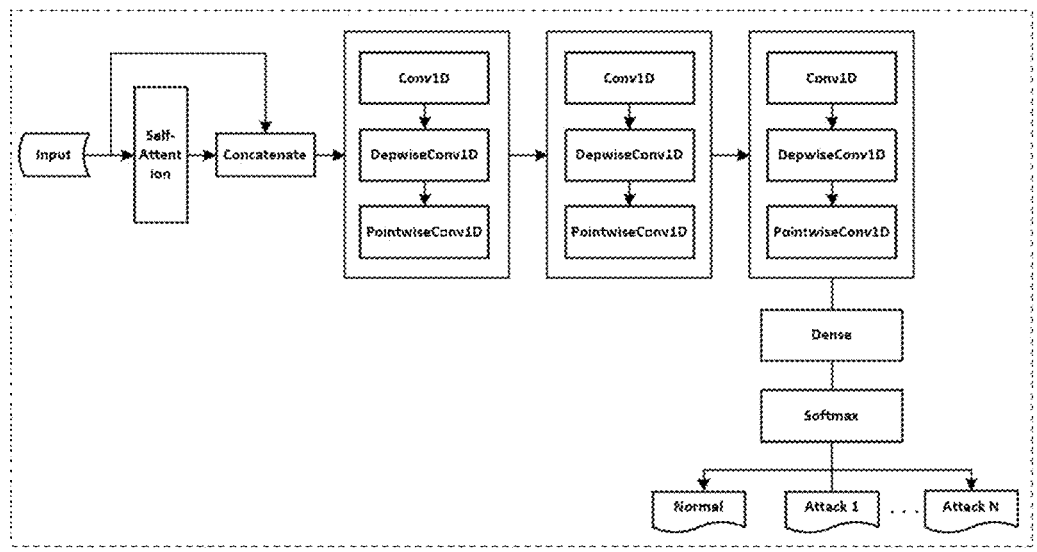
FIG. 4 is a student/second model structure of the present invention.

The second model structure is as shown in FIG. 4, wherein the second model comprises two parts: an extraction layer and a classification layer, wherein the extraction layer is configured to increase the dimensions of data and extract a feature matrix, and the classification layer is configured to classify the feature matrix.

In the extraction layer, the Conv1D layer is configured to increase the dimensions of the input sequence, and data features are extracted from the data after increasing the dimensions by using DepthwiseConv and PointwiseConv. A structure of the extraction layer may consist of a structure of at least one layer of Conv1D—DepthwiseConv—PointwiseConv.

In order to improve the performance of the model, the structure can be stacked multiple times. In this embodiment, the structure is stacked three times as the extraction layer.

The classification layer is configured to distinguish between normal data and multi-class attack data.

Figure 5:
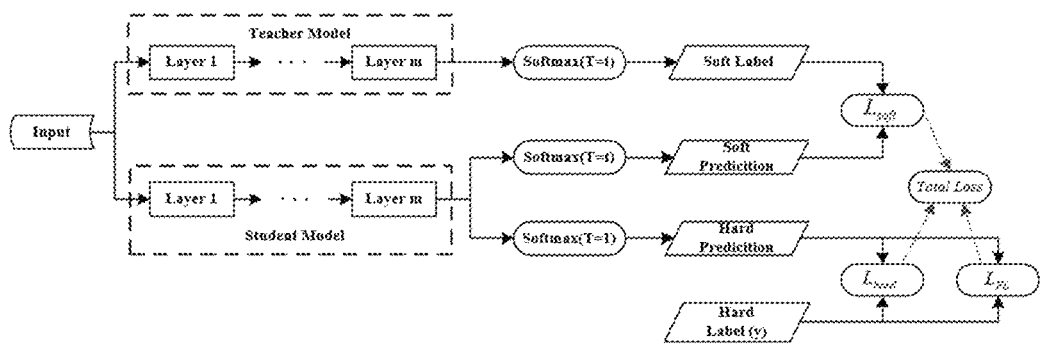
FIG. 5 is a flow chart of distillation training of the teacher model to the second model of the present invention.

S402: using the teacher model, the model training set and the model verification set to perform distillation training on the second model, and obtaining a student model after the training:

The data of the model training set is respectively inputted into the teacher model and the second model, and an improved distillation loss function is constructed by a corresponding output for the model training. The distillation training process is shown in FIG. 5, and an improved complete distillation training loss function is shown as follows:

$$Loss = \alpha L_{soft} + (1-\alpha)L_{hard} + \beta L_{FL}$$

wherein $$L_{soft} = -\sum_j^N p_j^T \log(q_j^T)$$

$$L_{hard} = -\sum_j^N c_j \log(q_j^1)$$

$$L_{FL} = -\alpha_i(1-p_{tj})^\gamma \log(p_{tj})$$

$p_j^T$ represents a value of an output layer of the teacher model under a temperature T on a class j; $q_j^T$ is a value of an output layer of the student model under the temperature T on the class j; $c_j$ represents a value of a real label on the class j; if the real label is the class j, it is 1, and otherwise, it is 0; at in $L_{FL}$ represents a weight of a class i; $p_{tj}$ is a value of the output layer of the student model at temperature 1 on class j; γ is a coefficient between values of [0, 5]; and α and β are coefficients belonging to [0, 1], and can be adjusted according to the performance of the distillation trained student model.

S5: testing a size and complexity of the student model, if the size and the complexity are higher than a preset value, adjusting parameters of the student model, and performing S4 again, and if the size and the complexity are lower than the preset value, using the model test set to test the performance of the student model; and if the test passes, saving the student model as a lightweight intrusion detection model of an internet of vehicles, and if the test fails, performing S1 to S4 again until the model passes a performance detection; and a test result is as shown in FIG. 9.

S501: inputting the model test set into the student model to detect the size and complexity of the student model.

A space size (Model Size) required for storing the model is used as a size index of the model, and the number of floating point operations (FLOPs) of the model is used as a model complexity index. If the indexes are both not greater than a preset value, a model performance detection is carried out. If the indexes are greater than the preset value, the model parameters are adjusted by returning to S401, such as the times of stacking. The following steps are continued until the indexes are no greater than the preset value.

S502 performing a performance detection on the student model:

Accuracy and balanced average (F1_score) are used as a performance quantification standard. The two performance indexes are calculated as follows:

$$\text{Accuracy} = \frac{TP + TN}{TP + FP + TN + FN}$$

$$\text{F1\_score} = \frac{2 \times TP}{2 \times TP + FP + FN}$$

wherein TP represents true positive, TN represents true negative, FP represents false positive, and FN represents false negative.

S6: deploying the lightweight intrusion detection model of the internet of vehicles into the internet of vehicles for an intrusion detection.

A model that passes the performance detection is used as a lightweight intrusion detection model of the internet of vehicles for deployment in terminal devices. The intrusion data is detected by the lightweight intrusion detection model of the internet of vehicles.

Figure 6:
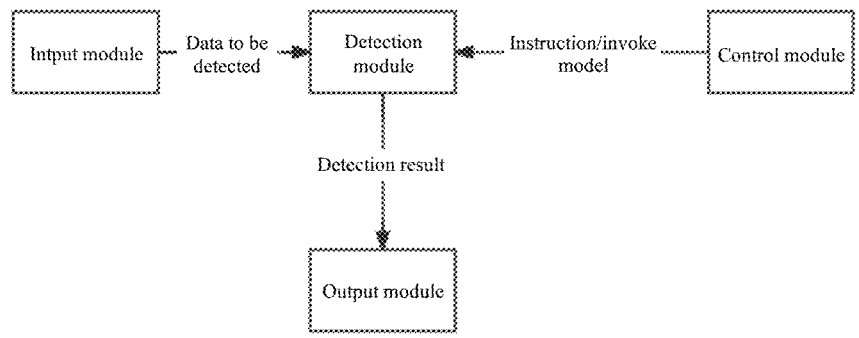
FIG. 6 shows a system structure of the present invention.

Second, following is a structure of a lightweight intrusion detection system of an internet of vehicles provided in the disclosed embodiment shown in FIG. 6, comprising:

an input module, a control module, a detection module, and an output module, wherein the input module is configured to input data to be detected;

the control module is configured to store a computer program and a lightweight intrusion detection model of an internet of vehicles, and is also configured to deliver an instruction through the detection module and the program;

the computer program is configured to implement the methods in the first aspect of the present invention;

the lightweight intrusion detection model of the internet of vehicles is generated by the training according to the methods of the first aspect of the present invention;

the detection module is configured to process the data according to the instruction;

the detection module is further configured to invoke a data model according to the instruction to perform a detection on the data; and the output module is configured to output a detection result of the detection module.

Third, provided in the embodiment is an intrusion detection terminal of an internet of vehicles, comprising an input device, an output device, a detector, and a controller, wherein the input device, the output device, the detector and the controller are interconnected, wherein the controller is configured to store a lightweight intrusion detection program and a lightweight intrusion detection model of an internet of vehicles, the lightweight intrusion detection program is configured to deliver an instruction to realize the method mentioned in the first aspect of the present invention, the controller is further configured to deliver an instruction to the detector, the detector is configured to pre-process data to be detected input by the input device according to the instruction, and invoke the lightweight intrusion detection model to detect pre-processed data, and the output device is configured to output a detection result.

Finally, it should be noted that the above is only preferred embodiments of the present invention and is not used to limit the present invention. Although the technical schemes of the present invention are described in detail by reference to the above embodiment, it is still possible for a person skilled in the art to modify the technical schemes described in the above embodiments or make equivalent replacements to part of the technical features. Any modification, equivalent replacement, improvement, etc. made within the spirit and principles of the present invention shall be included in the protection scope of the present invention.

What is claimed:

1. A lightweight intrusion detection method of an internet of vehicles based on knowledge distillation, comprises the following steps:
    S1: obtaining traffic data of the internet of vehicles, extracting network traffic features therefrom as a feature data set, and pre-processing the data;
    S2: dividing pre-processed data into an initial training set, an initial verification set and an initial test set according to a preset proportion, performing data balance on the initial training set to obtain a balanced training set, performing feature selection on the balanced training set, the initial verification set and the initial test set to obtain a model training set, a model verification set and a model test set;
    S3: building a first model, inputting the model training set and the model verification set into the first model for model training, and obtaining a teacher model after the training;
    S4: building a second model, and using the teacher model, the model training set and the model verification set to perform distillation training on the second model, and obtaining a student model after the training;
    S5: testing a size and complexity of the student model, if the size and the complexity are higher than a preset value, adjusting parameters of the second model, and performing S4 again, and if the size and the complexity are lower than the preset value, using the model test set to test the performance of the student model; and if the test passes, saving the student model as a lightweight intrusion detection model of an internet of vehicles, and if the test fails, performing S1 to S4 again until the model passes a performance detection; and
    S6: deploying the lightweight intrusion detection model of the internet of vehicles into the internet of vehicles for an intrusion detection.

2. The lightweight intrusion detection method of an internet of vehicles based on knowledge distillation according to claim 1, wherein the traffic data of the internet of vehicles in S1 comprises normal traffic and attack traffic.

3. The lightweight intrusion detection method of an internet of vehicles based on knowledge distillation according to claim 1, wherein the pre-processing in S1 comprises performing data cleaning, label coding and data normalization on the data.

4. The lightweight intrusion detection method of an internet of vehicles based on knowledge distillation according to claim 1, wherein the first model in S3 comprises three parts: an extraction layer, a relationship capture layer and a classification layer, wherein the extraction layer is configured to extract a feature sequence of data, the relationship capture layer is configured to capture a dependency relationship in the feature sequence, and the classification layer is configured to classify the sequence.

5. The lightweight intrusion detection method of an internet of vehicles based on knowledge distillation according to claim 1, wherein the second model in S4 comprises two parts: an extraction layer and a classification layer, wherein the extraction layer is configured to increase the dimensions of data and extract a feature matrix, and the classification layer is configured to classify the feature matrix.

6. The lightweight intrusion detection method of an internet of vehicles based on knowledge distillation according to claim 1, wherein space required for storing the model and the number of floating point operations are used as size and complexity indexes of the student model in S5.

7. The lightweight intrusion detection method of an internet of vehicles based on knowledge distillation according to claim 1, wherein in S5, the model detection uses accuracy and a balance average as performance indexes of the student model, and if both indexes are greater than the preset value, the model passes the detection.

\* \* \* \* \*